(12) United States Patent
Sell

(10) Patent No.: US 10,358,352 B1
(45) Date of Patent: Jul. 23, 2019

(54) PHOTOCHEMICAL REACTORS AND METHODS FOR MODIFICATION OF CARBON NANOMATERIALS

(71) Applicant: LOCKHEED MARTIN CORPORATION, Bethesda, MD (US)

(72) Inventor: Aaron G. Sell, Salem, NH (US)

(73) Assignee: Lockheed Martin Corporation, Bethesda, MD (US)

( * ) Notice: Subject to any disclaimer, the term of this patent is extended or adjusted under 35 U.S.C. 154(b) by 279 days.

(21) Appl. No.: 15/253,714

(22) Filed: Aug. 31, 2016

Related U.S. Application Data

(60) Provisional application No. 62/241,074, filed on Oct. 13, 2015, provisional application No. 62/241,076, filed on Oct. 13, 2015, provisional application No. 62/281,614, filed on Jan. 21, 2016.

(51) Int. Cl.
| | |
|---|---|
| *C01B 32/158* | (2017.01) |
| *B01J 19/12* | (2006.01) |
| *C01B 31/02* | (2006.01) |
| *B01J 19/00* | (2006.01) |
| *B01J 19/10* | (2006.01) |

(Continued)

(52) U.S. Cl.
CPC ....... *C01B 31/0266* (2013.01); *B01J 19/0013* (2013.01); *B01J 19/10* (2013.01); *B01J 19/128* (2013.01); *C01B 31/0273* (2013.01); *B01J 2219/0871* (2013.01); *B01J 2219/0877* (2013.01); *B01J 2219/1203* (2013.01); *B82Y 30/00* (2013.01); *B82Y 40/00* (2013.01); *C01B 2202/22* (2013.01); *Y10S 977/742* (2013.01); *Y10S 977/845* (2013.01); *Y10S 977/847* (2013.01)

(58) Field of Classification Search
None
See application file for complete search history.

(56) References Cited

U.S. PATENT DOCUMENTS

| | | | | |
|---|---|---|---|---|
| 3,624,400 | A | * | 11/1971 | Cohen .................... G02B 23/12 250/214 VT |
| 2007/0258880 | A1 | * | 11/2007 | Murakoshi ............. B82Y 15/00 423/447.1 |
| 2010/0166637 | A1 | * | 7/2010 | Ziegler .............. B01D 11/0492 423/447.1 |

\* cited by examiner

*Primary Examiner* — Kishor Mayekar
(74) *Attorney, Agent, or Firm* — Morgan, Lewis & Bockius LLP

(57) ABSTRACT

Carbon nanomaterials can undergo selective functionalization or defunctionalization in the presence of near-infrared electromagnetic radiation. In particular, semiconducting carbon nanotubes can be selectively functionalized or defunctionalized over metallic carbon nanotubes, which can allow their purification and/or separation to take place. Functionalizing methods can include exposing a carbon nanomaterial to electromagnetic radiation having a wavelength of about 700 nm or greater, and reacting at least a portion of the carbon nanomaterial with a reactive medium in the presence of the electromagnetic radiation to form a functionalized carbon nanomaterial. In the absence of the electromagnetic radiation, the carbon nanomaterial is unreactive with the reactive medium. Defunctionalizing methods can take place similarly in the absence of the reactive medium. Photochemical reactors incorporating a recirculation loop and a near-infrared electromagnetic radiation source can be used in functionalization and defunctionalization methods. In-line sonication can also be provided in the photochemical reactors.

10 Claims, 4 Drawing Sheets

(51) Int. Cl.
*B82Y 40/00* (2011.01)
*B82Y 30/00* (2011.01)

PHOTOCHEMICAL REACTORS AND METHODS FOR MODIFICATION OF CARBON NANOMATERIALS

CROSS-REFERENCE TO RELATED APPLICATIONS

The present application claims the benefit of priority under 35 U.S.C. § 119 from U.S. Provisional Patent Applications 62/241,074, filed on Oct. 13, 2015; 62/241,076, filed on Oct. 13, 2015; and 62/281,614, filed on Jan. 21, 2016, each of which is incorporated herein by reference in its entirety.

STATEMENT REGARDING FEDERALLY SPONSORED RESEARCH OR DEVELOPMENT

Not applicable.

FIELD

The present disclosure generally relates to carbon nanomaterials and, more specifically, to methods and reactors for modifying carbon nanomaterials.

BACKGROUND

Carbon nanotubes (CNTs) are typically formed as a mixture of metallic, semimetallic, and semiconducting species of varying lengths and diameters. For many applications, particularly those in the electronics industry, separation of semiconducting carbon nanotubes from the co-produced metallic and semimetallic species would be highly desirable. Limited purity and agglomeration of as-produced carbon nanotubes can also be problematic in this respect.

Non-limiting examples of approaches that have been used to achieve some degree of separation of carbon nanotube species from one another include, for example, selective aqueous two-phase solvent partitioning, reaction with sub-stoichiometric quantities of a functionalizing species, electrochemical separation, gradient centrifugation, and the like. However, these separation processes can be difficult to perform, are costly and time-consuming, and are not readily scalable to industrially relevant quantities. Moreover, surfactants are used in many of the foregoing separation processes and can be difficult to remove from the separated carbon nanotube species. If not removed, the surfactants can interfere with various downstream processes, such as the spin-coating methods that are utilized in the electronics industry.

In view of the foregoing, improved methods for achieving high-throughput separation and/or purification of carbon nanotubes and other carbon nanomaterials would be of significant interest in the art. In particular, the ready separation and purification of semiconducting carbon nanotubes would be highly desirable. The present disclosure satisfies the foregoing needs and provides related advantages as well.

SUMMARY

In various embodiments, the present disclosure describes methods for functionalizing carbon nanomaterials, such as carbon nanotubes. The methods can include: exposing a carbon nanomaterial to electromagnetic radiation having a wavelength of about 700 nm or greater, and reacting at least a portion of the carbon nanomaterial with a reactive medium in the presence of the electromagnetic radiation, thereby forming a functionalized carbon nanomaterial. The carbon nanomaterial is unreactive with the reactive medium in an absence of the electromagnetic radiation.

In other various embodiments, the present disclosure describes methods for defunctionalizing functionalized carbon nanomaterials, such as carbon nanotubes. The methods can include: exposing a functionalized carbon nanomaterial to electromagnetic radiation having a wavelength of about 700 nm or greater, and defunctionalizing at least a portion of the functionalized carbon nanomaterial in the presence of the electromagnetic radiation to form an at least partially defunctionalized carbon nanomaterial.

In still other various embodiments, the present disclosure describes photochemical reactors suitable for functionalizing or defunctionalizing carbon nanomaterials, such as carbon nanotubes. The photochemical reactors can include: a conduit defining a recirculation loop, a pump configured to circulate a reaction medium through the recirculation loop, a near-infrared electromagnetic radiation source configured to supply an input of electromagnetic radiation having a wavelength of about 700 nm or greater to a portion of the recirculation loop, and a cooling medium in thermal communication with the recirculation loop.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
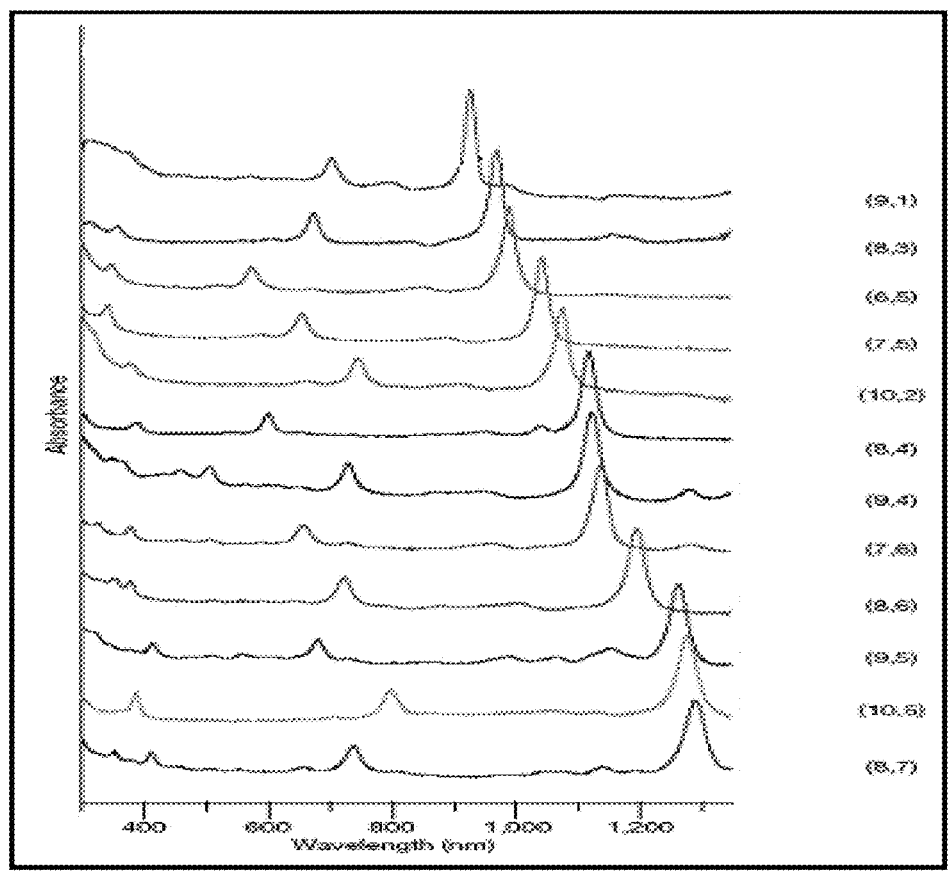
FIG. 1 shows a plot of relative absorbance versus wavelength for various semiconducting carbon nanotube chiralities.

The present disclosure is directed, in part, to methods for modifying carbon nanomaterials, such as carbon nanotubes, in a high-throughput manner. The present disclosure is also directed, in part, to photochemical reactors suitable for modifying carbon nanomaterials, such as carbon nanotubes. The present disclosure is also directed, in part, to surfactant-free compositions containing semiconducting carbon nanotubes that have been separated from metallic carbon nanotubes.

As discussed above, facile separation and/or purification of various carbon nanotube species would be highly desirable. However, separation and purification of carbon nanotube species can be very difficult to perform due to the relatively similar physical properties and reactivity profiles of various types of carbon nanotubes. The few separation processes that are available are not readily amenable to high-throughput, often utilize difficult-to-remove surfactants, and frequently fail to remove residual metal catalysts from as-synthesized carbon nanotubes, all of which can lead to further difficulties in downstream applications.

Slight differences in electrical properties between semiconducting and metallic carbon nanotubes can be exploited in some conventional separation processes (e.g., electrophoresis) to allow isolation of small amounts of various carbon nanotube types. For purposes of this disclosure, the term "metallic carbon nanotube(s)" encompasses both metallic and semimetallic carbon nanotube chiralities. A brief discussion of carbon nanotube chirality is provided below.

Similarly, semiconducting carbon nanotubes can be functionalized with some selectivity over metallic carbon nanotubes by utilizing a stoichiometric deficit of a functionalizing species, such as a diazonium salt or other electrophile. Differing solubility properties can then be utilized to separate functionalized semiconducting carbon nanotubes from unfunctionalized metallic carbon nanotubes. Such processes can be rather inefficient and low throughput, however.

Many carbon nanotube functionalization reactions take place with an input of thermal energy to drive the reactions to completion with a high extent of incorporated functional groups on the carbon nanotubes. A number of carbon nanotube functionalization reactions of this type will be familiar to one having ordinary skill in the art. Because the reactions are thermally driven and are conducted to achieve a high degree of substitution, they provide minimal or no selectivity between semiconducting and metallic carbon nanotubes. That is, both semiconducting and metallic carbon nanotubes undergo reaction, at least to some extent, under typical thermal reaction conditions. Although carbon nanotube functionalization reactions conducted with a stoichiometric deficit of a functionalizing species can overcome this lack of selectivity, the amount of incorporated functional groups is often much lower, which can make separation problematic. Further, the minimally functionalized semiconducting carbon nanotubes can lack desired properties for various downstream applications in some instances.

The present inventor discovered that photochemical reaction conditions can be utilized to promote selective modification of carbon nanotubes and other carbon nanomaterials, such as graphene. In particular, the inventor discovered that the significant absorption of near-infrared electromagnetic radiation by semiconducting carbon nanotubes can allow these types of carbon nanotubes to be reacted preferentially with a reactive medium in deference to metallic carbon nanotubes lacking this absorption profile. FIG. 1 shows a plot of relative absorbance versus wavelength for various semiconducting carbon nanotube chiralities, which demonstrates strong absorption in the near-infrared region of the electromagnetic spectrum. The absorption of near-infrared electromagnetic radiation by the semiconducting carbon nanotubes affects their selective heating and thermal reaction with the reactive medium. Metallic carbon nanotubes, in contrast, are transparent within the near-infrared region of the electromagnetic spectrum and do not undergo heating and reaction. Thus, semiconducting carbon nanotubes can be selectively functionalized under photochemical reaction conditions even when utilizing a stoichiometric excess of a functionalizing species. The functionalized semiconducting carbon nanotubes can then be separated based on solubility differences compared to unfunctionalized metallic carbon nanotubes.

Moreover, the inventor discovered that the functionalized semiconducting carbon nanotubes can be defunctionalized under comparable photochemical reaction conditions to return the semiconducting carbon nanotubes to their original functionalization state. Functionalized metallic carbon nanotubes, if present, do not undergo defunctionalization under these conditions. If desired, the photochemical functionalization and defunctionalization reactions can be iterated as many times as needed to achieve a desired degree of purity or separation of semiconducting carbon nanotube from residual metallic carbon nanotubes. Even when not separating semiconducting carbon nanotubes from metallic carbon nanotubes, the functionalization and defunctionalization reactions can be further advantageous in removing impurities, such as residual amorphous carbon and metal catalyst impurities. The improved purity and enrichment of semiconducting carbon nanotubes produced according to the present disclosure can make these entities highly desirable for certain downstream applications, such as those in the electronics industry.

The functionalization and defunctionalization reactions described herein can be further advantageous through achieving separation and purification of semiconducting carbon nanotubes by simple solvent partitioning and/or centrifugation techniques. These aspects of the presently described processes can provide for ready scalability. In some aspects, the presently described processes can be conducted without using a surfactant, thereby providing semiconducting carbon nanotube compositions that are surfactant-free.

The inventor further discovered facile techniques to provide a suitable input of near-infrared electromagnetic radiation to a carbon nanomaterial undergoing modification according to the disclosure herein. Although a specific near-infrared source, such as a near-infrared laser, can be utilized to provide electromagnetic radiation to a carbon nanomaterial, such sources can be expensive and difficult to obtain. The inventor discovered that filtering of a broadband infrared source or visible light source can provide electromagnetic radiation having a suitable wavelength range to practice the disclosure herein. In particular, the inventor discovered that inexpensive and readily available infrared heat lamps can be silicon filtered (e.g., with a disc of crystalline or polycrystalline silicon) to exclude essentially all wavelengths below about 900 nm. In particular, silicon filtering can provide a breadth of near-infrared wavelengths extending between about 950 nm and at least about 1400 nm. When exposed to electromagnetic radiation in this wavelength range, metallic carbon nanotubes are essentially unreactive.

More particularly, the inventor discovered that upon exposure to near-infrared electromagnetic radiation in the above wavelength range, semiconducting carbon nanotubes can be selectively functionalized using nitric acid to introduce carboxylic acid groups thereto. The reaction can occur selectively, even when an excess of nitric acid is present. It is believed that other electrophilic species, such as diazonium salts, can undergo a similar type of reaction. Once the semiconducting carbon nanotubes have been functionalized using nitric acid, they can be readily dissolved in water or aqueous bases, whereas the unfunctionalized metallic carbon nanotube remain insoluble, thereby allowing dissolution-based separation of the two to take place. Unfunctionalized semiconducting carbon nanotubes can be recovered by photochemically removing at least a portion of their carboxylic acid groups. It is also believed that functional groups introduced using other electrophilic species can undergo similar photochemical conditions. Accordingly, although certain disclosure herein is directed to the functionalization of semiconducting carbon nanotubes using nitric acid, it is to be recognized that other types of similar functionalization reactions are also contemplated by the inventor.

In addition to the above features, the carbon nanomaterial modification processes described herein can be readily conducted in reactor systems configured for recirculation and sonication of the carbon nanomaterial. Recirculation can allow a carbon nanomaterial to be exposed to near-infrared electromagnetic radiation multiple times in order to promote a high degree of functionalization. Sonication can allow exfoliation of bundled or agglomerated carbon nanomaterials into individual members, thereby allowing good contact between a reactive medium and the individual carbon nanomaterials to be realized.

Accordingly, in various embodiments, the present disclosure provides methods for modifying carbon nanomaterials by utilizing a photochemical functionalization or defunctionalization reaction.

In some embodiments, functionalization methods can include exposing a carbon nanomaterial to electromagnetic radiation having a wavelength of about 700 nm or greater, and reacting at least a portion of the carbon nanomaterial with a reactive medium in the presence of the electromagnetic radiation to form a functionalized carbon nanomaterial. According to some embodiments of the present disclosure, the carbon nanomaterial is unreactive with the reactive medium in the absence of the electromagnetic radiation.

In other embodiments, defunctionalization methods can include exposing a functionalized carbon nanomaterial to electromagnetic radiation having a wavelength of about 700 nm or greater, and defunctionalizing at least a portion of the functionalized carbon nanomaterial in the presence of the electromagnetic radiation to form an at least partially defunctionalized carbon nanomaterial. In some embodiments, at least a portion of the at least partially defunctionalized carbon nanomaterial can include defunctionalized semiconducting carbon nanotubes.

In some embodiments of the present disclosure, the carbon nanomaterial can be a plurality of carbon nanotubes, which can contain a mixture of semiconducting carbon nanotubes and metallic carbon nanotubes. Semiconducting carbon nanotubes can undergo selective functionalization and defunctionalization according to the disclosure herein. Although carbon nanotubes can undergo functionalization and defunctionalization according to the disclosure herein, it is to be recognized that other carbon nanomaterials such as fullerenes and graphene can undergo similar types of modification. Accordingly, it is to be recognized that any particular embodiments herein that are specifically directed to carbon nanotubes can be conducted similarly with other types of carbon nanomaterials.

As used herein, the term "carbon nanotube chirality" refers to a double index (n,m) describing a particular carbon nanotube, where n and m are integers that describe the cut and wrapping of hexagonal graphite when formed into a tubular structure. Such designation of a carbon nanotube's chirality will be familiar to one having ordinary skill in the art. As used herein, the term "semiconducting carbon nanotube" refers to a carbon nanotube that is defined by the relationship $|m-n|=3k+1$, where k is an integer. As used herein, the term "metallic carbon nanotube" refers to a carbon nanotube that is defined by the relationship $|m-n|=3k$, where k is an integer. Carbon nanotubes can be further characterized as being "zig-zag chirality" or "armchair chirality" based upon their chiral indices. For example, metallic carbon nanotubes having m=n are characterized as "armchair chirality" carbon nanotubes. Illustrative semiconducting carbon nanotube chiralities include, for example, (1,0), (2,0), (4,0), (5,0), (7,0), (8,0), (10,0), (11,0), (13,0), (14,0), (16,0), (2,1), (3,1), (5,1), (6,1), (8,1), (9,1), (11,1), (12,1), (14,1), (15,1), (3,2), (4,2), (6,2), (7,2), (9,2), (10,2), (12,2), (13,2), (15,2), (4,3), (5,3), (7,3), (8,3), (10,3), (11,3), (13,3), (14,3), (5,4), (6,4), (8,4), (9,4), (11,4), (12,4), (14,4), (6,5), (7,5), (9,5), (10,5), (12,5), (13,5), (7,6), (8,6), (10,6), (11,6), (13,6), (8,7), (9,7), (11,7), (12,7), (9,8), (10,8), (12,8), (10,9), (11,9), and (11,10). Illustrative metallic carbon nanotube chiralities include, for example, (3,0), (6,0), (9,0), (12,0), (15,0), (4,1), (7,1), (10,1), (13,1), (5,2), (8,2), (11,2), (14,2), (6,3), (9,3), (12,3), (7,4), (10,4), (13,4), (8,5), (11,5), (9,6), (12,6), (10,7), and (11,8).

In more particular embodiments, the electromagnetic radiation used to promote functionalization and/or defunctionalization of the carbon nanomaterial, particularly carbon nanotubes, can be near-infrared electromagnetic radiation. As used herein, the term "near-infrared electromagnetic radiation" refers to electromagnetic radiation having wavelengths within a range of about 700 nm to about 3000 nm. In more specific embodiments of the present disclosure, the electromagnetic radiation used for promoting functionalization or defunctionalization of carbon nanomaterials can be near-infrared electromagnetic radiation having a wavelength of about 900 nm or greater. In still more specific embodiments, the electromagnetic radiation can have a wavelength residing within a range of about 900 nm to about 3000 nm, or about 950 nm to about 3000 nm, or about 1000 nm to about 3000 nm, or about 950 nm to about 1400 nm. Both singular and plural wavelengths within these ranges are contemplated by the present disclosure, or the electromagnetic radiation can include a broadband emission within the above foregoing ranges. Higher wavelengths in the mid- and far-infrared regions of the electromagnetic spectrum can also be present in some instances. These lower-energy wavelengths are not considered to impact the selectivity of the functionalization and defunctionalization reactions described herein.

When reaction selectivity of semiconducting carbon nanotubes over metallic carbon nanotubes is desired, the electromagnetic radiation can have a minimum wavelength of about 800 nm, or about 850 nm, or about 900 nm, or about 950 nm, or about 1000 nm in some embodiments of the present disclosure.

When it is desired to conduct a photochemical reaction upon a carbon nanomaterial without particular selectivity, the minimum wavelength of near-infrared electromagnetic radiation can be as low as 700 nm. Under these conditions, both metallic and semiconducting carbon nanotubes can react, for example. Embodiments in which non-selective reaction of carbon nanomaterials can be desirable are also discussed hereinafter.

Figure 2:
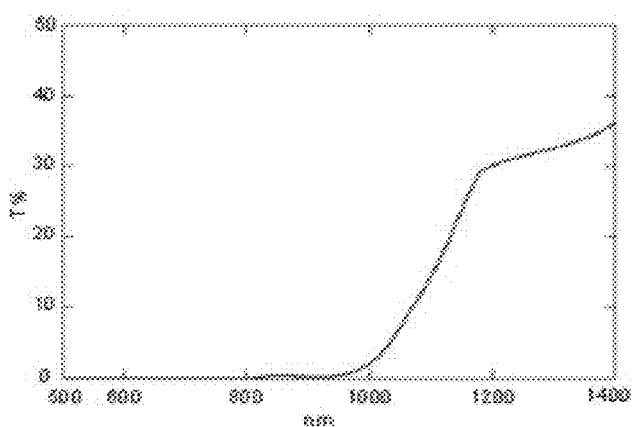
FIG. 2 shows an illustrative plot of the spectral output of an infrared heat lamp that has been filtered with a silicon wafer.

As indicated above, a silicon-filtered infrared radiation source can provide suitable near-infrared electromagnetic radiation in some embodiments of the present disclosure. Suitable infrared radiation sources in this regard can include various types of infrared heat lamps, for example, which provide a broad emission of electromagnetic wavelengths in the visible and infrared region of the electromagnetic spectrum. Silicon filtering can reduce this emission to wavelengths within the near-infrared region. FIG. 2 shows an illustrative plot of the spectral output of an infrared heat lamp that has been filtered with a silicon wafer. As shown in FIG. 2, wavelengths below about 800 nm are entirely excluded by the silicon wafer, and between about 800 nm and about 950 nm there is minimal spectral output. Above about 950 nm, the spectral intensity rises significantly and remains at high levels to at least 1400 nm, the measurement limit of the spectrometer. Comparing the spectral output shown in FIG. 2 to the near-infrared absorbance peaks of various carbon nanotube chiralities (see FIG. 1), it can be seen that silicon filtering provides near-infrared electromagnetic radiation in precisely the wavelength range needed to take advantage of this absorbance.

Although a silicon-filtered infrared radiation source can be advantageous in some embodiments of the present disclosure, it is to be recognized that other electromagnetic radiation sources and filters can be used in alternative embodiments. Near-infrared filters other than a silicon wafer can be used in some embodiments, particularly when a narrower wavelength range is desired, such as to achieve additional selectivity for a certain carbon nanotube chirality over another. In addition, other near-infrared electromagnetic radiation sources, such as near-infrared lasers, can also be used in some embodiments of the present disclosure. Suitable alternative filters and near-infrared electromagnetic radiation sources will be familiar to one having ordinary skill in the art.

Embodiments of the present disclosure directed to the functionalization of carbon nanomaterials will now be described in greater detail with reference to the functionalization of a plurality of carbon nanotubes. Accordingly, in some embodiments, the carbon nanomaterial can be a plurality of carbon nanotubes containing a mixture of semiconducting carbon nanotubes and metallic carbon nanotubes, in which the semiconducting carbon nanotubes are reactive with the reactive medium in the presence of the near-infrared electromagnetic radiation and the metallic carbon nanotubes are unreactive in the presence of the near-infrared electromagnetic radiation.

The carbon nanotubes used in the embodiments of the present disclosure can be produced by any suitable technique. Suitable synthetic processes can include, for example, arc methods, laser oven, chemical vapor deposition, flame synthesis, and high pressure carbon monoxide (HiPCO). The synthetic conditions of any of these techniques can be altered to change the chirality distribution produced, particularly to favor the production of carbon nanotubes with a dominant chirality or type being produced. In addition, the carbon nanotubes can be used as-produced (raw) or they can be partially purified (e.g., to partially enrich one or more chiralities, and/or to at least partially remove metal catalyst used during their synthesis).

Carbon nanotube lengths and diameters can also be varied in the embodiments of the present disclosure. In some embodiments, an average length of the carbon nanotubes can range between about 1 µm and about 500 µm, or between about 1 µm and about 10 µm, or between about 10 µm and about 100 µm, or between about 100 µm and about 200 µm, or between about 200 µm and about 300 µm, or between about 300 µm and about 400 µm, or between about 400 µm and about 500 µm. In other embodiments, the carbon nanotubes can have an average length that is greater than about 500 µm, including, for example, between about 500 µm and about 700 µm, or between about 700 µm and about 1000 µm.

In some embodiments, the carbon nanotubes can have diameters ranging between about 1 nm and about 20 nm. In more particular embodiments, the carbon nanotubes can have diameters ranging between about 1 nm and about 10 nm, or between about 1 nm and about 7 nm, or between about 1 nm and about 5 nm, or between about 2 nm and about 6 nm, or between about 2 nm and about 5 nm, or between about 3 nm and about 8 nm.

In some embodiments, the carbon nanotubes undergoing modification according to the present disclosure can be single-walled carbon nanotubes. In other embodiments, mixtures of single-walled carbon nanotubes and multi-walled carbon nanotubes can undergo modification.

In various embodiments, the reactive medium can include nitric acid or a mixture of nitric acid and sulfuric acid. Such reaction conditions can be effective to form functionalized carbon nanotubes containing a plurality of carboxylic acid groups. The resulting carboxylic acid-functionalized carbon nanotubes can be dissolved in base or neutral water, with any unreacted carbon nanotubes remaining insoluble. Specifically, under the photochemical reaction conditions of the present disclosure, the foregoing types of reactive media can promote selective functionalization of semiconducting carbon nanotubes over metallic carbon nanotubes. Upon promoting dissolution and separation, the unreacted metallic carbon nanotubes remain insoluble.

As indicated above, other types of reactive media containing electrophilic species can also undergo selective reaction in a similar manner. For example, in non-limiting embodiments, semiconducting carbon nanotubes can be reacted with diazonium salts or related reactive species in an appropriate solvent in preference to metallic carbon nanotubes. In this case, the functionalized semiconducting carbon nanotubes remain hydrophobic (absent hydrophilic functionalities introduced by the diazonium salt), and they can be dissolved in various organic solvents in which they are more soluble than unfunctionalized metallic carbon nanotubes, thereby allowing separation of the functionalized semiconducting carbon nanotubes to be realized. Diels-Alder cycloaddition processes and related cycloaddition processes such as 1,3-dipolar cycloadditions can be promoted similarly through exposure to an appropriate input of electromagnetic radiation.

Accordingly, various embodiments of the present disclosure can include dispersing the functionalized carbon nanomaterial in a solvent, specifically functionalized semiconducting carbon nanotubes, and separating the functionalized semiconducting carbon nanotubes from the metallic carbon nanotubes, which are unfunctionalized. As a result, the metallic carbon nanotubes can remain insoluble in the solvent. Separation of the metallic carbon nanotubes can involve techniques such as, for example, filtration, centrifugation, differential settling, or any combination thereof.

As indicated above, the methods of the present disclosure can also include at least partially defunctionalizing the functionalized semiconducting carbon nanotubes. In more general embodiments, methods of the present disclosure can include separating a functionalized carbon nanomaterial from a reactive medium, such as a nitric acid-containing reactive medium; and after separating the functionalized carbon nanomaterial, at least partially defunctionalizing the functionalized carbon nanomaterial. Defunctionalizing the functionalized semiconducting carbon nanotubes can restore their original properties, should the properties following functionalization not be suitable for an intended application. In addition, separating and defunctionalizing functionalized semiconducting carbon nanotubes or another functionalized carbon nanomaterial can allow exfoliation and/or purification to take place that may not otherwise be possible with the unfunctionalized nanomaterial.

Suitable defunctionalization methods can include, for example, thermal defunctionalization, reaction with a chemical defunctionalizing agent, photochemical defunctionalization, or any combination thereof. Photochemical defunctionalization reactions can be particularly desirable since they can be readily accomplished in tandem with the above-described photochemical functionalization methods, optionally using the same equipment or processing line.

In more particular embodiments, photochemical defunctionalization of functionalized semiconducting carbon nanotubes or a similar functionalized carbon nanomaterial can include exposing the functionalized semiconducting carbon nanotubes or functionalized carbon nanomaterial to electromagnetic radiation having a wavelength of about 700 nm or higher. In still more particular embodiments, photochemical defunctionalization can take place using near-infrared electromagnetic radiation from a silicon-filtered infrared radiation source, such as electromagnetic radiation having a wavelength of about 900 nm or greater. Electromagnetic radiation having wavelengths within any of the ranges noted above can also be used to affect defunctionalization.

Defunctionalization can take place by exposing the functionalized carbon nanotubes or similar functionalized carbon nanomaterial to the electromagnetic radiation while dispersed in a liquid phase. Both dispersions and true solutions can be suitable in this respect. In some instances, defunctionalization can take place without a separate defunctionalizing species being present. As used herein, the term "defunctionalizing species" refers to a chemical agent that reacts with a carbon nanomaterial functional group to promote its removal from the carbon nanomaterial. Suitable examples of defunctionalizing species will be familiar to one having ordinary skill in the art. As with the reactive medium used to promote functionalization of carbon nanomaterials, the defunctionalizing species can be unreactive with the functionalized carbon nanomaterial until a suitable input of electromagnetic radiation has been supplied.

In the case of functionalized semiconducting carbon nanotubes or similar functionalized carbon nanomaterials that contain carboxylic acid groups, mild reducing agents can serve as a suitable defunctionalizing species in the presence of near-infrared electromagnetic radiation. In more specific embodiments, ammonium hydroxide can be a suitable defunctionalizing species. Other suitable mild reducing agents will be familiar to one having ordinary skill in the art. In some embodiments, alkali metal bases and alkaline earth metal bases can be used to promote defunctionalization in a similar manner. In still other embodiments, defunctionalization of carboxylic acid groups can take place without ammonium hydroxide or another defunctionalizing species being present.

In some embodiments, functionalization of carbon nanotubes and other carbon nanomaterials can be used to promote purification thereof. For example, a carbon nanomaterial can be selectively or non-selectively functionalized according to the present disclosure to alter the solubility of the carbon nanomaterial relative to the as-produced solubility. The altered solubility can then allow removal of impurities, such as amorphous carbon and metal catalysts, for example. Thereafter, the functional groups can be removed from the functionalized carbon nanomaterial to restore the original carbon nanomaterial but in a more purified state. In the case of carbon nanotubes, the purified carbon nanotubes can represent isolated semiconducting or metallic carbon nanotubes, or a mixture of semiconducting and metallic carbon nanotubes. Optionally, the carbon nanotubes can remain functionalized after undergoing purification. Whether the carbon nanotubes remain functionalized or not following purification can be dictated by the requirements of a particular downstream application.

Photochemical reactors suitable for carrying out the functionalization and defunctionalization reactions described above are also provided herein. In various embodiments, the photochemical reactors can include a conduit defining a recirculation loop, a pump configured to circulate a reaction medium through the recirculation loop, a near-infrared electromagnetic radiation source configured to supply an input of electromagnetic radiation having a wavelength of about 700 nm or greater to a portion of the recirculation loop, and a cooling medium in thermal communication with the recirculation loop. In some embodiments, the cooling medium can be located downstream of a location where the input of electromagnetic radiation is supplied to the recirculation loop.

In more particular embodiments, the near-infrared electromagnetic radiation source can be a silicon-filtered infrared radiation source (see FIG. 4) or a near-infrared laser, as described in more detail above.

In further embodiments, the photochemical reactors of the present disclosure can include a vessel configured to provide an input of ultrasonic energy to the recirculation loop. In some embodiments, the recirculation loop can pass through the vessel configured to provide the input of ultrasonic energy. Both probe- and bath-type sonication systems can be utilized in this regard. Suitable examples of such sonication systems will be familiar to one having ordinary skill in the art.

Figure 3:
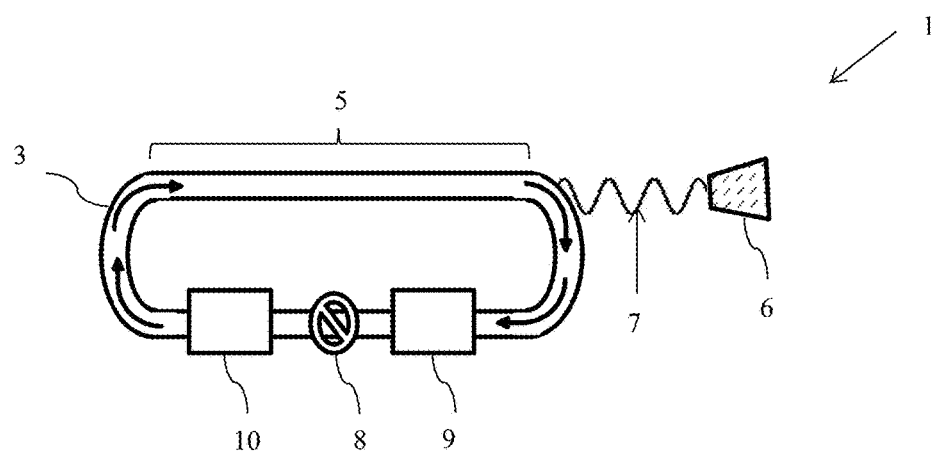
FIG. 3 shows an illustrative schematic of a photochemical reactor suitable for use in the functionalization and defunctionalization reactions described herein.

FIG. 3 shows an illustrative schematic of a photochemical reactor suitable for use in the functionalization and defunctionalization reactions described herein. As shown in FIG. 3, photochemical reactor 1 includes recirculation loop 3, optionally having elongated section 5. The directionality of recirculation flow is depicted by arrows in FIG. 3. Electromagnetic radiation source 6 is configured to provide electromagnetic radiation 7 to recirculation loop 3, which is made of a material that is optically transparent to the electromagnetic radiation. Glass, for example, can be a suitable material in the case of the near-infrared region of the electromagnetic spectrum. As shown in FIG. 3, electromagnetic radiation source 6 is configured to provide electromagnetic radiation 7 longitudinally along elongated section 5 to allow maximization of the interaction pathlength between electromagnetic radiation 7 and a circulating carbon nanomaterial. It is to be recognized that other configurations for interacting electromagnetic radiation 7 with recirculation loop 3 are also possible. Although not depicted in FIG. 3, lenses, mirrors, parabolic reflectors, and the like can also be used to promote interaction of electromagnetic radiation 7 with a circulating carbon nanomaterial in recirculation loop 3, if desired.

Pump 8 is also in fluid communication with recirculation loop 3 in FIG. 3. Suitable pumps will be familiar to one having ordinary skill in the art and are not considered to be particularly limited. Likewise, the location of pump 8 with respect to recirculation loop 3 is not considered to be particularly limited.

Referring still to FIG. 3, cooling medium 9 is in thermal communication with recirculation loop 3. As shown in FIG. 3, cooling medium 9 is a flow-through cooling vessel, but it is to be recognized that other types of cooling media are also possible. Suitable cooling media 9 can include, for example, cooling jackets, refrigeration, and the like. Likewise, as shown in FIG. 3, cooling medium 9 is positioned downstream of the location where electromagnetic radiation 7 has been supplied to recirculation loop 3. Disposition of cooling medium 9 in this manner can allow the circulating reaction medium to be effectively cooled after heating takes place following a photochemical reaction, which can help to limit thermal degradation. It is to be recognized, however, that the depicted placement of cooling medium 9 should be considered exemplary, and one having ordinary skill in the art can envision placing it another location to accommodate the needs of a particular application. In fact, cooling medium 9 can be omitted in some instances.

Likewise, photochemical reactor 1 also includes optional sonication vessel 10 in some embodiments of the present disclosure. Sonication of a circulating carbon nanomaterial can allow exfoliation to take place in order to promote more effective reaction thereof. In some embodiments, sonication of the reactive medium can take place in a location where exposure to electromagnetic radiation 7 takes place. In other embodiments, sonication can take place just before or just after the location where exposure to electromagnetic radiation 7 takes place. Again, the placement of sonication vessel 10 is not considered to be particularly limited and the configuration of FIG. 3 should be considered exemplary in nature.

Figure 4:
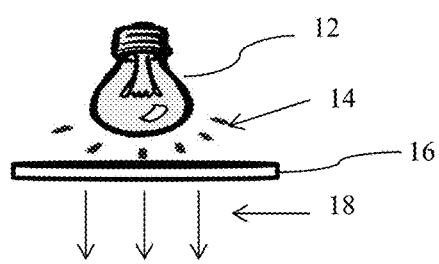
FIG. 4 shows an illustrative schematic of a silicon-filtered infrared radiation source.

As indicated above, a silicon-filtered infrared radiation source can be particularly effective for promoting functionalization of carbon nanotubes and other carbon nanomaterials. FIG. 4 shows an illustrative schematic of a silicon-filtered infrared radiation source. As shown in FIG. 4, infrared lamp 12 emits a broadband emission of electromagnetic radiation 14, which is directed toward silicon disk 16. Silicon disk 16 filters electromagnetic radiation 14 into a filtered beam of electromagnetic radiation 18, which has a wavelength of about 900 nm or higher, with the most intense wavelengths residing at about 950 nm or above.

In further embodiments of the present disclosure, methods of the present disclosure can further include synthesizing carbon nanotubes or another type of carbon nanomaterial. In still further embodiments, the output of a reactor used for producing carbon nanotubes or another type of carbon nanomaterial can be coupled to a photochemical reactor used for conducting functionalization or defunctionalization, thereby allowing a complete feedstock to functionalized nanomaterial production line can be established.

In further embodiments, methods of the present disclosure can additionally include spin-coating a solution of carbon nanotubes produced in accordance with the present disclosure. Suitable spin-coating techniques will be familiar to one having ordinary skill in the art. Suitable substrates for spin-coating will likewise be familiar to one having ordinary skill in the art, and in some embodiments, the substrate may be a silicon substrate. Electronic devices such as carbon nanotube field effect transistors can be produced in some embodiments.

EXAMPLES

Example 1

A functionalization reaction was carried out with raw SG-65i (Nanointegris, 96% enriched semiconducting carbon nanotubes) carbon nanotubes by dispersal in 50% nitric acid. The mixture was irradiated for 15 minutes with a heat lamp filtered with a silicon wafer. The resulting suspension was filtered and the carbon nanotubes were dispersed in water. The water dispersion was centrifuged and the liquid phase was separated from the insoluble, unreacted carbon nanotubes. The liquid phase carbon nanotubes had a resistivity of 540 kOhms/sq following spin coating. Semiconducting carbon nanotubes processed by traditional procedures (e.g., the NIST procedure), in contrast, had a resistivity of only 360 kOhms/sq.

Figure 5A:
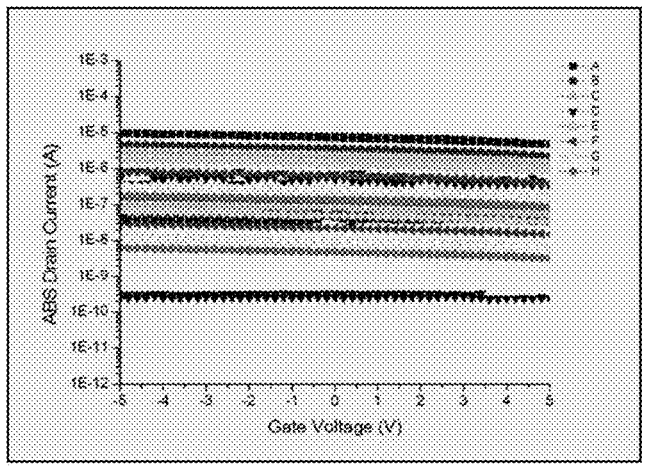
FIGS. 5A-5D show illustrative plots of field effect device properties for raw, 99% semiconducting-enriched, and experimentally processed carbon nanotubes.
Figure 5B:
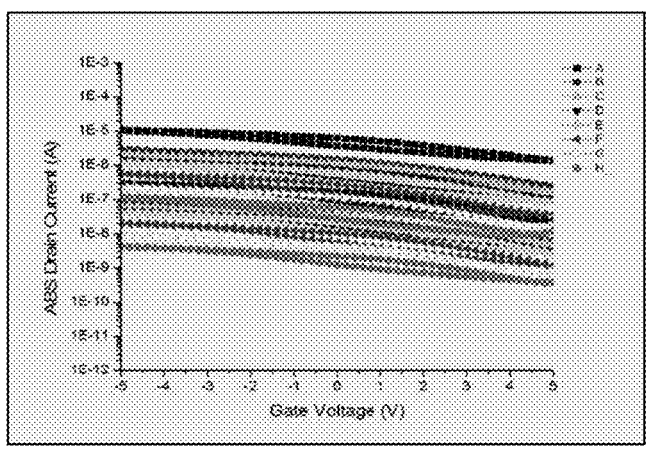
Figure 5C:
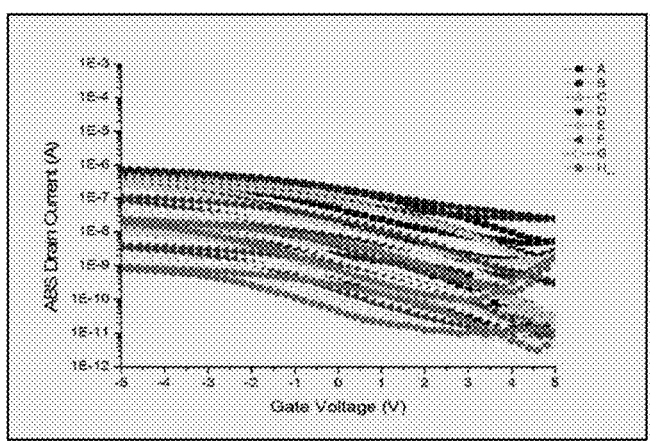
Figure 5D:
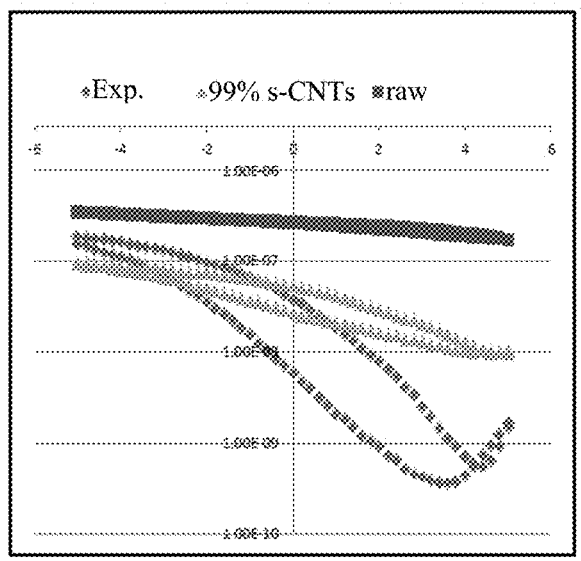

Field effect devices were fabricated by spin coating raw SG-65i, 99% semiconducting-enriched, or experimentally processed carbon nanotubes onto a silicon substrate. FIGS. 5A-5D show illustrative plots of field effect device properties for raw, 99% semiconducting-enriched, and experimentally processed carbon nanotubes. As shown in FIG. 5A, raw SG-65i carbon nanotubes produced no switching. The semiconducting-enriched carbon nanotubes produced minimal switching, as shown in FIG. 5B. In contrast, as shown in FIG. 5C, the experimentally processed carbon nanotubes gave decidedly superior switching performance. FIG. 5D shows an illustrative drain current versus gate voltage plot for the three types of carbon nanotubes. The 99% semiconducting-enriched carbon nanotubes only produced a minimal hysteresis, whereas the experimentally processed carbon nanotubes produced a significant hysteresis, leading to a much larger ON-OFF ratio.

Example 2

The functionalization reaction of Example 1 was repeated to produce a carbon nanotube solution. Ammonium hydroxide was added to the carbon nanotube solution, which was then irradiated with IR radiation, thereby resulting in precipitation of the carbon nanotubes. No effects were seen prior to exposure to the IR radiation. The carbon nanotubes were collected by centrifugation and were re-functionalized in a similar manner to Example 1. Upon undergoing the second functionalization reaction, the liquid phase carbon nanotubes had a resistivity of 450 kOhms/sq upon spin coating. The absorption spectrum following functionalization was very similar to that of an authentic sample containing enriched semiconducting carbon nanotubes.

Example 3

A solution of carboxylic acid-functionalized carbon nanotubes was spin-coated onto a silicon wafer. Both semiconducting and metallic carbon nanotubes were present in the applied solution. Thereafter, silicon-filtered infrared electromagnetic radiation was supplied to the functionalized carbon nanotubes with a heat lamp. The functionalized carbon nanotube solution had nearly completed its drying process upon the silicon wafer before the electromagnetic radiation was supplied, so the water evaporated in a few seconds to leave the carbon nanotubes disposed on the silicon surface.

As discussed above, exposure of the functionalized carbon nanotubes to the electromagnetic radiation resulted in defunctionalization of the semiconducting carbon nanotubes, thereby leaving the metallic carbon nanotubes with their carboxylic acid functionalities intact. The carboxylic acid-functionalized metallic carbon nanotubes were removed from the silicon wafer by washing with an ammonium hydroxide solution, leaving at least partially defunctionalized semiconducting carbon nanotubes on the silicon wafer.

Figure 6A:
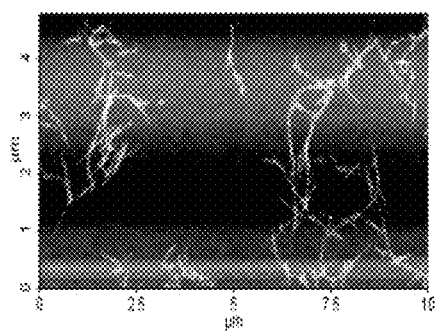
FIGS. 6A and 6B show illustrative SEM images of a spin-coated silicon wafer before and after removal of functionalized metallic carbon nanotubes.
Figure 6B:
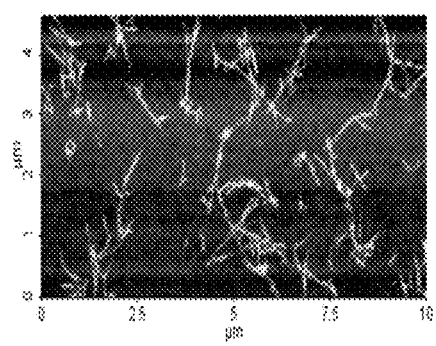

FIGS. 6A and 6B show illustrative SEM images of a spin-coated silicon wafer before and after removal of functionalized metallic carbon nanotubes. FIG. 6A shows the silicon wafer following water washing in accordance with the disclosure above, whereas FIG. 6B shows the corresponding image initially produced from spin coating. The image of FIG. 6A represents 3 layers of spin-coating, whereas the image of FIG. 6B represents only 2 layers. Both samples produced sheet resistivity values of approximately 1 GOhm/sq. Thus, the standard coating process produced the same sheet resistivity with only 2 nanomaterial layers. The comparable sheet resistivity at a greater coating thickness suggests a higher percentage of remaining semiconducting carbon nanotubes following defunctionalization and ammonium hydroxide washing.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A method comprising:
   exposing a carbon nanomaterial to electromagnetic radiation having a wavelength of about 700 nm or greater; and
   reacting at least a portion of the carbon nanomaterial with an acidic reactive medium in the presence of the electromagnetic radiation, thereby forming a functionalized carbon nanomaterial;
      wherein the carbon nanomaterial is unreactive with the reactive medium in an absence of the electromagnetic radiation.

2. The method of claim 1, wherein the electromagnetic radiation is near-infrared electromagnetic radiation having a wavelength of about 900 nm or greater.

3. The method of claim 2, wherein the carbon nanomaterial is a plurality of carbon nanotubes, the plurality of carbon nanotubes comprising a mixture of semiconducting carbon nanotubes and metallic carbon nanotubes;
   wherein the semiconducting carbon nanotubes are reactive with the reactive medium in the presence of the near-infrared electromagnetic radiation and the metallic carbon nanotubes are unreactive in the presence of the near-infrared electromagnetic radiation, the functionalized carbon nanomaterial comprising functionalized semiconducting carbon nanotubes.

4. The method of claim 3, wherein the reactive medium comprises nitric acid.

5. The method of claim 3, further comprising:
   dispersing the functionalized carbon nanomaterial in a solvent; and
   separating the functionalized semiconducting carbon nanotubes from the metallic carbon nanotubes;
      wherein the functionalized semiconducting carbon nanotubes are soluble in the solvent and the metallic carbon nanotubes are insoluble in the solvent.

6. The method of claim 5, further comprising:
   after separating the functionalized semiconducting carbon nanotubes, at least partially defunctionalizing the functionalized semiconducting carbon nanotubes.

7. The method of claim 6, wherein the functionalized semiconducting carbon nanotubes are at least partially defunctionalized through a photochemical defunctionalization reaction.

8. The method of claim 3, further comprising:
   separating the functionalized carbon nanomaterial from the reactive medium; and
   after separating the functionalized carbon nanomaterial, at least partially defunctionalizing the functionalized carbon nanomaterial.

9. The method of claim 8, wherein the functionalized carbon nanomaterial is at least partially defunctionalized through a photochemical defunctionalization reaction.

10. The method of claim 2, further comprising:
    providing the near-infrared electromagnetic radiation from a silicon-filtered infrared radiation source.

* * * * *